(12) United States Patent
Gasparrini et al.

(10) Patent No.: US 8,277,358 B2
(45) Date of Patent: Oct. 2, 2012

(54) EPICYCLIC REDUCTION GEAR WITH MULTIPLE MODULAR STAGES FOR TUBULAR MOTOR REDUCERS OPERATING WINDING ROLLER SHUTTER, ROLLER SHADES AND THE LIKE

(75) Inventors: Paolo Gasparrini, Fermo (IT); Dante Postacchini, Fermo (IT)

(73) Assignee: Gaposa S.R.L., Fermo (IT)

( * ) Notice: Subject to any disclaimer, the term of this patent is extended or adjusted under 35 U.S.C. 154(b) by 1148 days.

(21) Appl. No.: 12/086,371

(22) PCT Filed: Dec. 12, 2006

(86) PCT No.: PCT/IT2006/000844
§ 371 (c)(1),
(2), (4) Date: Jun. 11, 2008

(87) PCT Pub. No.: WO2007/069288
PCT Pub. Date: Jun. 21, 2007

(65) Prior Publication Data
US 2009/0176615 A1    Jul. 9, 2009

(30) Foreign Application Priority Data
Dec. 13, 2005   (IT) .................. MC05A0133

(51) Int. Cl.
*F16H 57/08* (2006.01)
(52) U.S. Cl. ......................................................... 475/331
(58) Field of Classification Search ................... 475/331
See application file for complete search history.

(56) References Cited

U.S. PATENT DOCUMENTS

| 4,133,344 | A | | 1/1979 | Hunter et al. |
| 4,825,727 | A | | 5/1989 | Komuro |
| 5,336,136 | A | * | 8/1994 | Jacqui ............................ 475/337 |
| 6,379,276 | B1 | | 4/2002 | Cheng |
| 6,872,161 | B2 | | 3/2005 | DiCarlo |
| 2006/0154778 | A1 | * | 7/2006 | Sowul et al. .................. 475/331 |

FOREIGN PATENT DOCUMENTS
WO    WO 00/11372    2/2000
* cited by examiner

*Primary Examiner* — Edwin A Young
(74) *Attorney, Agent, or Firm* — Lowe Hauptman Ham & Berner LLP

(57) ABSTRACT

The present invention relates to an epicyclic reduction gear with multiple modular stages (M1, M2, M3) for tubular motor reducers operating winding roller shutters, roller shades and the like. Each reduction stage is provided with a central toothed hub (1) on one side and a central splined hub (5) on the other side, in compliance with the said hub, the hub (8) of a stage being designed to be coupled with a pin (5) of the adjacent stage.

5 Claims, 2 Drawing Sheets

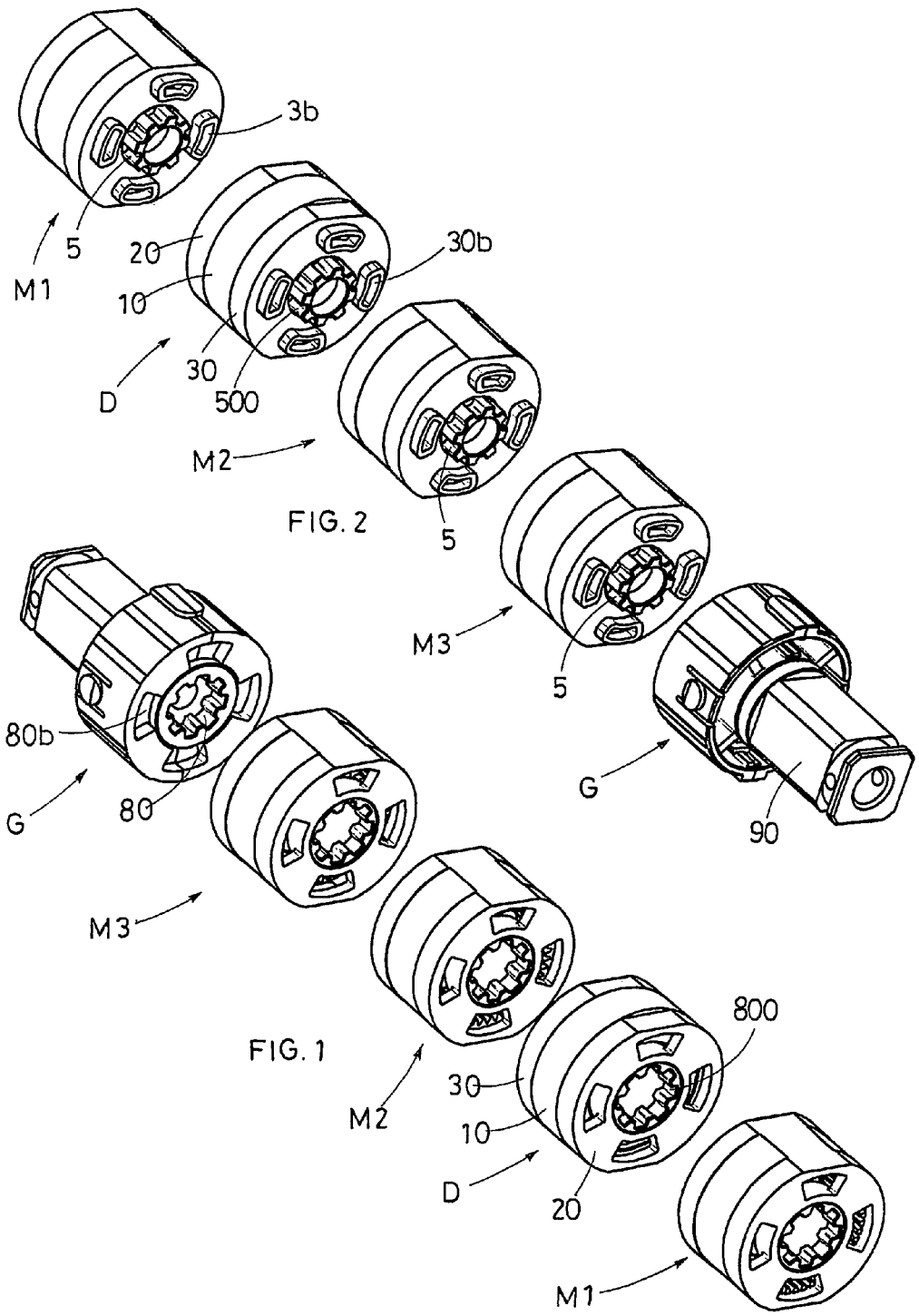

EPICYCLIC REDUCTION GEAR WITH MULTIPLE MODULAR STAGES FOR TUBULAR MOTOR REDUCERS OPERATING WINDING ROLLER SHUTTER, ROLLER SHADES AND THE LIKE

The present patent application for industrial invention relates to an epicyclic reduction gear with multiple modular stages for tubular motor reducers operating winding roller shutters, roller shades and the like.

The structural configuration and operating modes of the said tubular motor reducer are standardised.

This type of motor reducers comprises an epicyclic reduction gear with multiple modular stages housed inside a tubular case and driven into rotation by an electrical motor mounted in external position on one of the two openings of the tubular case and oriented in such a way that its spindle is coaxially aligned with the said tubular case and the pin of the last stage protrudes from the opposite opening for the power take-off.

The adapter that is directly coupled with the roller of the winding shades is splined on the said pin.

A motor reducer of this type is disclosed in the European patent EP 976909 by the same applicant.

The said epicyclic reduction gear is traditionally composed of a train with three stages, of which the first stage is specifically configured to be coupled with the spindle of the electrical motor, and the third, or in any case the last of the train of stages, is suitably configured to be coupled with the adapter.

In view of the fact that rolling shutters can be of different type and have a different weight, a range of different models of motor reducers is necessary, each of them with its own reduction gear ratio, it being evident that motor reducers characterised by high speed and limited torque are preferred to operate light-weighted rolling shades, while in the case of heavier rolling shutters, such as rolling blinds, the torque intensity must be privileged with respect to speed.

In order to change the rotation speed of the winding roller of a shutter, one or more of the said stages need to be changed during production and replaced with another stage with suitable gear ratio that takes the same place in the train of stages as the replaced one.

The first limitation of this solution consists in the limited range of speed regulation, in view of the fact that the reduced dimensions imposed on this type of tubular motor reducers do not permit to increase the radius of the gears that operate in each reduction stage.

A further drawback of the known technique is represented by the need to produce different reduction stages that are selectively used in the train of stages of the epicyclic reduction gear, being selected from time to time in view of the torque or speed to be obtained at the tubular motor reducer output.

Starting from these considerations on the limits-of the current tubular motor reducers for roller shutters, a new model of epicyclic reduction gear with multiple stages has been devised, with the possibility of coupling the said stages in any sequence in the train of the individual stages that form the epicyclic reduction gear.

In other words, the first stage of the epicyclic reduction gear of the invention is interchangeable with the last stage or with any intermediate stage, which is exactly the opposite situation as epicyclic reduction gears of known type, since, as mentioned above, the first stage of the latter is always configured to be coupled with the spindle of the electrical motor and the last stage of the train is always suitably configured to be coupled with the adapter that drives into rotation the winding roller of the roller shutters.

In the epicyclic reduction gear with multiple modular stages of the invention the output speed of the reduction gear may be varied, during the reduction gear assembly, by simply changing the sequential order of the individual reduction stages that form the train of reduction stages.

The inventive solution that has permitted to achieve interchangeability between the reduction stages consists in providing each reduction stage with a central toothed hub on one side and a central splined pin on the other side, suitable for the said hub, it being evident that the hub of a stage is designed to be coupled with the pin of the adjacent stage.

The presence of the epicyclic modular reduction gear of the invention requires the use of two adapters, the first one being designed to be coupled with the winding roller of the shade, and the second one being designed to be coupled with the spindle of the electrical motor, it being evident that the first adapter must be provided with means to engage with the last reduction stage, and the second adapter must be provided with means to engage with the first reduction stage.

Since the reduction stages are of modular and interchangeable type, it can be said that the first and the second adapter are provided with compatible means to engage with the toothed hub or the splined pin of all reduction stages.

For major clarity the description of the epicyclic reduction gear of the invention continues with reference to the enclosed drawings, which are intended for purposes of illustration only and not in a limiting sense, whereby:

FIG. 1 is an exploded axonometric view of the epicyclic reduction gear of the invention, seen from the electrical motor side;

FIG. 2 is an exploded axonometric view of the epicyclic reduction gear of the invention, seen from winding roller side;

It must be noted that the enclosed figures show an epicyclic reduction gear formed of three modular stages, in which the input of each stage is provided with "female" engagement means and the output with "male" engagement means, it being evident that it is also possible to provide the said female engagement means at the input and the male engagement means at the output.

With reference to FIGS. 1 and 2, the epicyclic reduction gear (R) is formed of a train of three modular stages (M1, M2, M3) designed to be coupled one after the other in any sequence.

(M1) indicates the first stage, that is to say the stage towards the electrical motor, not shown in the figure, and (M3) indicates the last stage, that it to say the stage towards the winding roller of the shade, not shown in the figure.

The modular stages (M1, M2, M3) have the same size and configuration, while the gear ratio depends on the size of the gears they contain.

Figure 3:
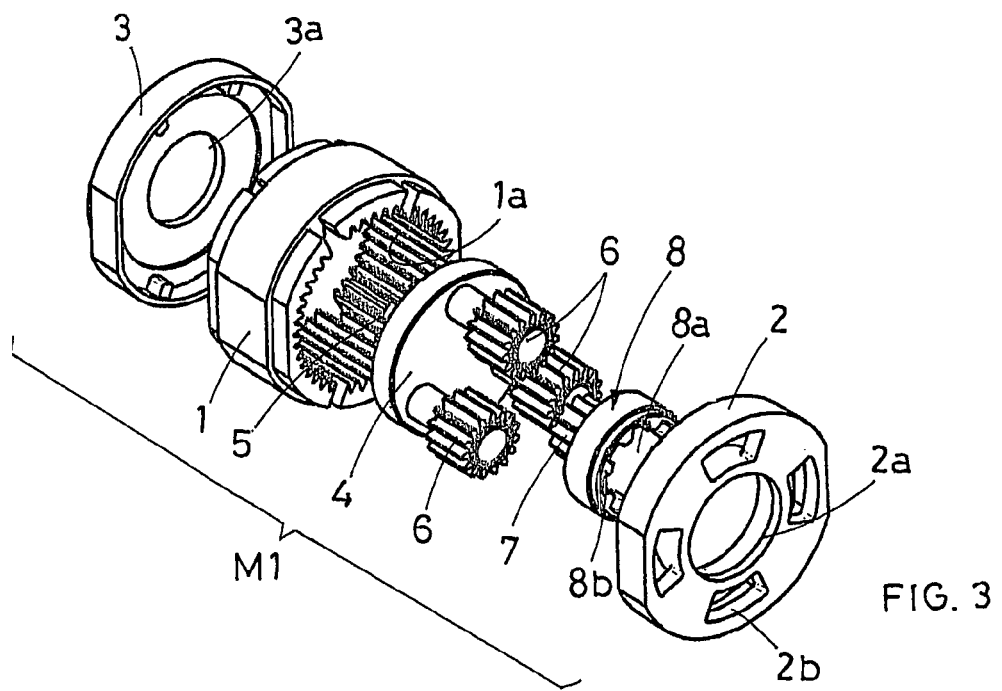
FIG. 3 is an exploded axonometric view of one of the reduction stages of the epicyclic reduction gear of the invention.

With reference to FIG. 3, each reduction stage is formed of a fixed central collar (1) laterally closed by a first lid (2) and a second lid (3), each of them provided with a central hole (2a) and (3a), respectively.

The fixed collar (1) houses and rotates a satellite-holder disk (4), which centrally supports a splined pin (5) on one side and a peripheral sequence of three satellites (6) that engage with the internal teeth (1a) of the said collar (1).

The satellites (6) also engage with a central pinion (7) that protrudes from the bottom (8a) of a cup-shaped hub (8), which is provided with internal teeth (8b) and is placed in central position flush with the hole (2a), while the splined pin (5) protrudes from the hole (3a).

The size and shape of the splined pin (5) are such that it can engage with the internal teeth (8b) of the hub (8), it being evident that the hub (8) of a stage is designed to be coupled with the pin (5) of the adjacent stage.

In order to avoid rotational sliding between the modular stages (M1, M2, M3), the first lid (2) is externally provided with an annular series of slots (2b), while the second lid (3) is externally provided with corresponding projections (3b), it being evident that the projections (3b) of a stage are designed to be coupled with the slots (2b) of the adjacent stage.

As mentioned in the premise, the use of the epicyclic modular reduction gear (R) requires the use of two adapters, the first one being designed to be coupled with the pin of the power take-off to which the winding roller of the shade is connected, and the second one being designed to be coupled with the spindle of the electrical motor, it being evident that the first adapter must be provided with means to engage with the last reduction stage (M3), while the second adapter must be provided with means to engage with the first reduction stage (M1).

FIGS. 1 and 2 illustrate the first adapter (G) provided with means for engagement with the last reduction stage (M3).

Since a splined pin (5) is available at the output of the last stage (M3), the adapter (G) is provided with a toothed hub (80) identical to the hub (8) on one side, capable of engaging with the splined pin (5), and with a square pin (90) on the other side, capable of engaging with the hub of the winding roller of the shade.

The toothed hub (80) is situated in the centre of a cylindrical case provided with an annular series of slots (80b) identical and corresponding to the aforementioned slots (2b).

As mentioned above, tubular motor reducers used to operate roller shutters provided with the reduction gear of the invention usually equipped with a mechanical device to make them irreversible.

More precisely, the device allows the motor reducer to drive into rotation the winding roller of the shade or shutter in both directions, preventing in any case a force exerted directly on the shade from driving the spindle of the electrical motor into rotation, according to a backward transmission process.

Figure 4:
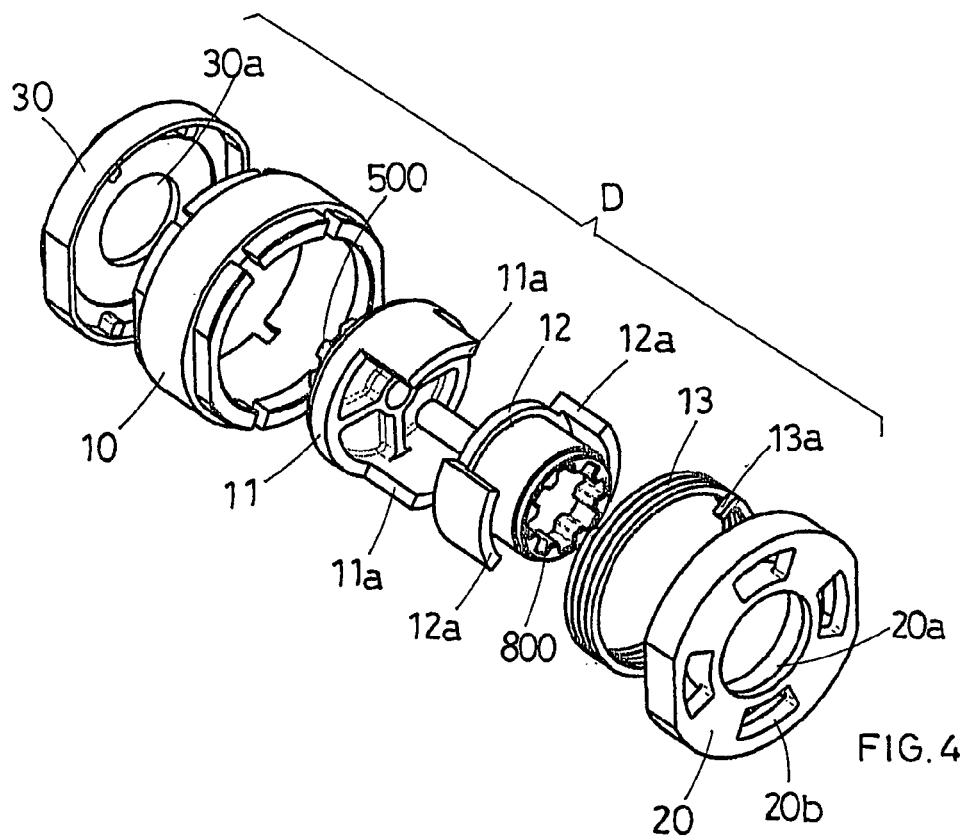
FIG. 4 is an exploded axonometric view of the device that is usually mounted in the said tubular motor reducers to make them irreversible.

FIG. 4 illustrates the device (D) of known type with reference to operating modes and construction, which are disclosed in detail in the aforementioned European patent EP 976909.

The device (D) is formed of a first disk (11) provided with an opposite couple of front teeth (11a) and a second disk (12), equally provided with an opposite couple of front teeth (12a) and a helical cylindrical spring (13) that ends with two close ends (13a) folded inwards in radial direction.

The first disk (11) and the second disk (12) provide the same coupling as the couplings with front teeth.

In order to be incorporated in the reduction gear (R) of the invention, the device (D) is built with a collar (10) identical to the aforementioned collar (1), designed to house the disks (11 and 12) and the spring (13) and closed on both sides by a first lid (20) and a second lid (30), identical to the lids (2 and 3) and respectively provided with central holes (20a) and (30a), identical to the aforementioned holes (2a) and (3a).

The first lid (20) is provided with an annular series of slots (20b), identical to the slots (2b) and the second lid (30) is provided with corresponding projections (30b), identical to the projections (2b).

A toothed hub (800) is situated at the centre of the hole (20a) obtained on the second disk (12) on the opposite side with respect to the front teeth (12a), and a splined pin (500) protrudes from the hole (30a) obtained on the first disk (11) on the opposite side with respect to the front teeth (11a).

The splined pin (500) is designed to engage with the hub (8) or the hub (80) and the toothed hub (800) is designed to engage with the splined pin (5).

In view of the above, the device (D) can be positioned in any location of the train of three stages (M1, M2, M3), that is to say before the first stage (M1) or after the last stage (M3) or between any adjacent pair of stages (M1, M2, M3).

The invention claimed is:

1. Epicyclic reduction gear with multiple modular stages for tubular motor reducers operating winding roller shutters, roller shades, formed of a train of reduction stages (M1, M2, . . . ) designed to be coupled one after the other, said reduction gear (R) being characterized in that each reduction stage is centrally provided with a hub (8) with internal teeth (8b) on one side and a splined pin (5) on the other side, designed to engage with the said teeth (8b), in such a way that the splined pin (5) of a stage is coupled with the toothed hub (8) of the adjacent stage.

2. Reduction gear as claimed in claim 1, characterized in that each reduction stage (M1, M2, . . . ) is formed of a central fixed collar (1) laterally closed by a first lid (2) and a second lid (3), which houses a rotating satellite-holder disk, which centrally supports said splined pin (5) on one side and a peripheral sequence of three satellites (6) that engage both with internal teeth (1a) of the said collar (1) and a central pinion (7) that protrudes from the bottom (8a) of the hub (8), which is provided with internal teeth (8b) and is placed in central position flush with a hole (2a) in central position on the first lid (2), while the splined pin (5) protrudes from a hole (3a) in central position on the second lid (3).

3. Reduction gear as claimed in claim 2, characterized in that the first lid (2) is externally provided with an annular series of slots (2b) and the second lid (3) is externally provided with corresponding projections (3b), in such a way that the projections (3b) of a stage are coupled with the slots (2b) of the adjacent stage (2b) in male-female configuration.

4. Reduction gear as claimed in claim 3, characterized in that it incorporates a device (D) formed of a first disk (11) with an opposite pair of front teeth (11a), and a second disk (12), equally provided with an opposite pair of front teeth (12a), and a cylindrical helical spring (13), all of them housed inside a collar (10) identical to the said collar (1) and laterally closed by a first lid (20), identical to the said lid (2) and a second lid (30), identical to the said lid (3), both being provided with respective central holes (20a and 30a), identical to the said holes (2a and 3a); wherein a toothed hub (800) is situated in the centre of the hole (20a), identical to the toothed hub (8) and obtained on the second disk (12) on the opposite side with respect to the front teeth (12a), and a splined pin (500) protrudes from the hole (30a), identical to the splined pin (5) and obtained on the first disk (11) on the opposite side with respect to the front teeth (11a).

5. Reduction gear as claimed in claim 4, characterized in that the first lid (20) is provided with an annular series of slots (20b), identical to the slots (2b), and the second lid (30) is provided with corresponding projections (30b), identical to the (2a) projections (3b).

* * * * *